(12) United States Patent
Shah et al.

(10) Patent No.: US 12,732,441 B2
(45) Date of Patent: Sep. 8, 2026

(54) ENABLING SCALE OUT RECORDING CAPABILITIES FOR PRODUCTION NETWORK WITHOUT MONITORING FABRIC

(71) Applicant: Arista Networks, Inc., Santa Clara, CA (US)

(72) Inventors: Sandip Shah, Santa Clara, CA (US); Arup Raton Roy, Burnaby (CA); Ryan Izard, Santa Clara, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 348 days.

(21) Appl. No.: 18/600,599

(22) Filed: Mar. 8, 2024

(65) Prior Publication Data

US 2025/0193095 A1 Jun. 12, 2025

Related U.S. Application Data

(60) Provisional application No. 63/606,972, filed on Dec. 6, 2023.

(51) Int. Cl.

*H04L 43/045* (2022.01)
*H04L 45/74* (2022.01)
*H04L 67/1095* (2022.01)

(52) U.S. Cl.

CPC ............ *H04L 43/045* (2013.01); *H04L 45/74* (2013.01); *H04L 67/1095* (2013.01)

(58) Field of Classification Search

CPC ... H04L 43/045; H04L 45/74; H04L 67/1095; H04L 43/026; H04L 43/028; H04L 43/062; H04L 43/12

See application file for complete search history.

(56) References Cited

U.S. PATENT DOCUMENTS

| | | | | |
|---|---|---|---|---|
| 10,419,327 | B2 | 9/2019 | Izard et al. | |
| 11,956,126 | B1 * | 4/2024 | Jangam | H04L 41/122 |
| 2018/0367398 | A1 * | 12/2018 | Pani | H04L 41/0873 |
| 2019/0116111 | A1 * | 4/2019 | Izard | H04L 45/24 |
| 2021/0182212 | A1 * | 6/2021 | Borikar | G06F 12/1027 |
| 2023/0198676 | A1 * | 6/2023 | K N | H04L 1/1809 370/236 |
| 2025/0184309 | A1 * | 6/2025 | Kommula | G06N 5/022 |

* cited by examiner

*Primary Examiner* — Schquita D Goodwin

(74) *Attorney, Agent, or Firm* — Sprinkle IP Law Group

(57) ABSTRACT

To scale out recording capabilities, recorder nodes and service leaf or Top-of-Rack (TOR) switches are added to a production network and provisioned to a network-wide workload orchestration and workflow automation platform operating in a cloud computing environment or on the premises of an enterprise. Additionally, switches in the production network are configured to, at ingress, capture packets of a traffic flow between workload applications, mirror the captured packets, and add metadata to an encapsulation header of each captured packet. The encapsulation header includes a virtual Internet Protocol (VIP) address of a recorder node cluster as the destination IP Address. The mirrored packets are routed to the VIP address. The service leaf or TOR switches symmetrically hash the mirrored packets and store them on a recorder node in the cluster. Through a centralized dashboard, a user can search, select, view, diagnose, analyze, or manage network components of the production network.

20 Claims, 6 Drawing Sheets

Start New Packet Capture Session

Packet Capture Name: PC.Jein-smith.v13.11.21

Rate Limit: 2.1 Gbps

Recorder Node
DMF-RACK258-RN-1
(6.4Gbps Used of 15.5Gbps -- 52TB Used of 192TB Storage)

Refresh

Search Type: Tag Query — Group: Finance

| Associated Devices | Associated Interfaces (9) | Direction |
| --- | --- | --- |
| Device: accel | Ethernet1: 1Gbps | Both RX TX |
| | Ethernet3: 1Gbps | Both RX TX |
| Device: acca | Ethernet5: 1Gbps | Both RX TX |
| | Ethernet6: 1Gbps | Both RX TX |
| | Ethernet7: 1Gbps | Both RX TX |
| | Ethernet9: 1Gbps | Both RX TX |
| | Ethernet10: 1Gbps | Both RX TX |
| | Ethernet11: 1Gbps | Both RX TX |
| Device: balkin | Ethernet13: 1Gbps | Both RX TX |

ACL: Select

CANCEL CREATE

ENABLING SCALE OUT RECORDING CAPABILITIES FOR PRODUCTION NETWORK WITHOUT MONITORING FABRIC

CROSS-REFERENCE TO RELATED APPLICATION(S)

This is a conversion of, and claims a benefit of priority under 35 U.S.C. § 119(e) from, U.S. Provisional Application No. 63/606,972, filed Dec. 6, 2023, entitled "ENABLING SCALE OUT RECORDING CAPABILITIES FOR PRODUCTION NETWORK WITHOUT MONITORING FABRIC," the entire content of which is fully incorporated by reference herein for all purposes.

TECHNICAL FIELD

This disclosure relates generally to packet-based network traffic monitoring, recording, and analysis. More particularly, this disclosure relates to a new approach for enabling scaling out recording capabilities for a monitored network without having to rely on a monitoring fabric.

BACKGROUND OF THE RELATED ART

Currently, to monitor a packet forwarding network, which is referred to herein as a production network or a monitored network, a monitoring fabric is employed to monitor and analyze the network traffic (i.e., packets) that has been tapped or mirrored from the production network. An example of a production network is described in U.S. Pat. No. 10,419,327, entitled "SYSTEMS AND METHODS FOR CONTROLLING SWITCHES TO RECORD NETWORK PACKETS USING A TRAFFIC MONITORING NETWORK," which is incorporated herein by reference.

The production network may include switches that forward network traffic between end hosts. A monitoring network that is not used to forward network traffic between end hosts of the production network may have network interfaces that are connected to the production network. The monitoring network may include switches that form a monitoring fabric and may further include network interfaces that receive copied (e.g., by tapping or mirroring) network traffic from the production network. The monitoring network may further include a controller (e.g., a controller server) configured for controlling the switches in the monitoring fabric to forward the tapped network packets along desired network paths over the monitoring network.

An example of a monitoring network with a monitoring fabric is also described in the above-referenced U.S. Pat. No. 10,419,327. In this example, the monitoring network and the production network are two separate and distinct networks, each having a plurality of switches, and are connected through tap paths. The production network further includes network monitoring devices that are configured for tapping into the network traffic flows between network elements in the production network, observing the network traffic without interfering the network traffic flows, and sending copies of packets observed by the network monitoring devices to the monitoring network via the tap paths. If desired, tap devices can be integrated into the switches of the production network for tapping network traffic to the monitoring network. A tap device may be formed as dedicated circuitry on a switch or as software in the form of a port mirroring function (sometimes referred to as a SPAN function) that may be enabled or disabled. When the port mirroring function is enabled, all network traffic received by the switch at a first port may be copied and sent to a second port of the switch that serves as a tap port. When the port mirroring function is disabled, the second port may be unused or serve as a normal packet forwarding port.

The copies of the packets sent by the network monitoring devices are received by the monitoring fabric. The monitoring fabric, which can be characterized as a network packet broker, is architected for pervasive, organization-wide visibility and security, delivering multi-tenant monitoring-as-a-service. A non-limiting example of the monitoring fabric architecture is shown in FIG. 1.

As illustrated in FIG. 1, a monitoring fabric 100 receives tapped network traffic from the production network (e.g., packets from application workloads 110). The monitoring fabric 100 may implement Software Defined Networking (SDN) software for pervasive visibility (e.g., network observability), hop-by-hop monitoring, predictive analytics, security monitoring, connection tracking, and event/application correction, and so on. The hop-by-hop visibility, predictive analytics and scale-out packet capture are integrated through a single dashboard. This integration streamlines network performance monitoring (NPM) and network security workflows for real-time and historical context, delivering a one-stop visibility solution for on-premise data centers, enterprise campus/branch, and mobile networks.

Through this dashboard, which can be implemented as a web-based graphical user interface, authorized users of the monitoring fabric 100 can monitor network traffic among users of the application workloads 110, devices (which can include Internet of Things (IoT)), and applications running on those devices in a production network and run analytics on network performance, application performance, network vulnerability, storage management, device connectivity, etc. By analyzing the mirrored network traffic, the monitoring fabric 100 can provide the users with useful insights and visibility into the physical (e.g., hardware), virtual (e.g., software), and container environments.

As discussed above, the monitoring network can include a controller configured for controlling the switches in the monitoring fabric. The controller, which can be implemented as a virtual machine (VM) or a hardware appliance, is configured for centralized configuration, monitoring, and troubleshooting, utilizing the centrally deployed tools.

For instance, as described in the above-referenced U.S. Pat. No. 10,419,327, a controller (e.g., an analytics engine or query and visualization tools associated with the controller) may receive a packet recording policy that identifies a set of the tapped network packets to be recorded. Recorded packets may be stored at packet recorders coupled to the monitoring network and may be retrieved at a later time as necessary to analyze the past performance of the packet forwarding network. The controller may generate network paths that forward the set of tapped network packets from the network interfaces to one or more packet recorders through switches in the monitoring network for storage at the packet recorders. The controller may query a subset of the set of tapped network packets stored at the packet recorders over control paths.

In the example of FIG. 1, the centrally deployed tools 120 can optionally include packet recorders 122. The packet recorders 122, which can be implemented as x86-based appliances, are coupled to the monitoring fabric 100 to provide the aforementioned packet recording, querying, and replay functions.

As described in the above-referenced U.S. Pat. No. 10,419,327, a production network may be implemented locally (e.g., at a particular geographic location such as a school or college campus, server or data farm, building, business campus, airport, hospital, other locations having networks managed by one or more network administrators, etc.) or may be distributed across multiple geographic locations. Likewise, a monitoring network may be implemented locally (e.g., at the same geographic location as part or all of the production network), may be implemented at a different geographic location than the production network (e.g., may be remote from the production network), or may be distributed across multiple locations, if desired. While the locations of the production network and the monitoring network may differ from deployment to deployment, these deployments leverage the same monitoring fabric architecture described above.

An issue here is the scalability of the monitoring fabric. This is because the volume of the network traffic and/or the storage requirement can grow over time. To accommodate this growth, one solution is to scale out the recording capabilities. Because the monitoring fabric is managed separately from the production network, this scaling out solution requires modifications be performed on components of both the production network and the monitoring network, including the network monitoring devices and switches in the production network and the monitoring fabric of switches, controllers, service nodes, and recorder nodes in the monitoring network.

What is needed, therefore, is a new scaling out solution that can provide a tighter integration between a production network and a monitoring network such that a user can monitor the production network through centrally managed tools and services. This disclosure addresses this need and more.

BRIEF DESCRIPTION OF DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 4 depicts an example of a web-based graphical user interface for searching interfaces using tagged properties according to some embodiments disclosed herein.

DETAILED DESCRIPTION

Specific embodiments will now be described with reference to the accompanying figures (FIGS.). The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

This disclosure provides a new approach that aims to eliminate the need to use a monitoring fabric. As discussed above, currently, to monitor and analyze network traffic on a production network, the network traffic is tapped or mirrored from the production network to a monitoring network. A monitoring fabric is deployed in the monitoring network to analyze the network traffic that has been tapped or mirrored from the production network. The new approach disclosed herein allows an operator of the production network to add recorder nodes to the production network directly. If desired, a monitoring fabric (e.g., DANZ Monitoring Fabric™ (DMF)) can still be used in an environment where a monitoring network is completely isolated from a production network managed by a different entity or team.

The recorder nodes, in turn, can be centrally managed through a network-wide workload orchestration and workflow automation platform operating in a cloud computing environment (hereinafter referred to as the "platform"), providing a centralized, consolidated management of production networks with monitoring and analytical capabilities. To this end, the platform provides a centralized dashboard for provisioning, configuration, operation of production networks and recorder nodes. Through this single pane of glass (i.e., the centralized dashboard), a user can view raw packets at the flow level, application level, and network entity level; perform network packet analyses on tapped or mirrored network traffic (e.g., network traffic on various layers of network services such as the transport layer, L4, the session layer, L5, the presentation layer, L6, and/or the application layer, L7, as defined in the networking infrastructure known as the Open Systems Interconnection (OSI) model); and configure manual or trigger-based packet capture.

Further, the recording capabilities are optimized and scaled out by storing filtered/sliced packets. In some embodiments, this is done by provisioning the recorder nodes added to the production network to the platform so that the nodes can augment the storage capability of the platform to store in-network packets without using a full-fledged monitoring fabric. Applications running on the platform can utilize this additional ability to capture and store packets for further analysis. As discussed above, packet capture can either be based on user configuration or event triggered.

Figure 1:
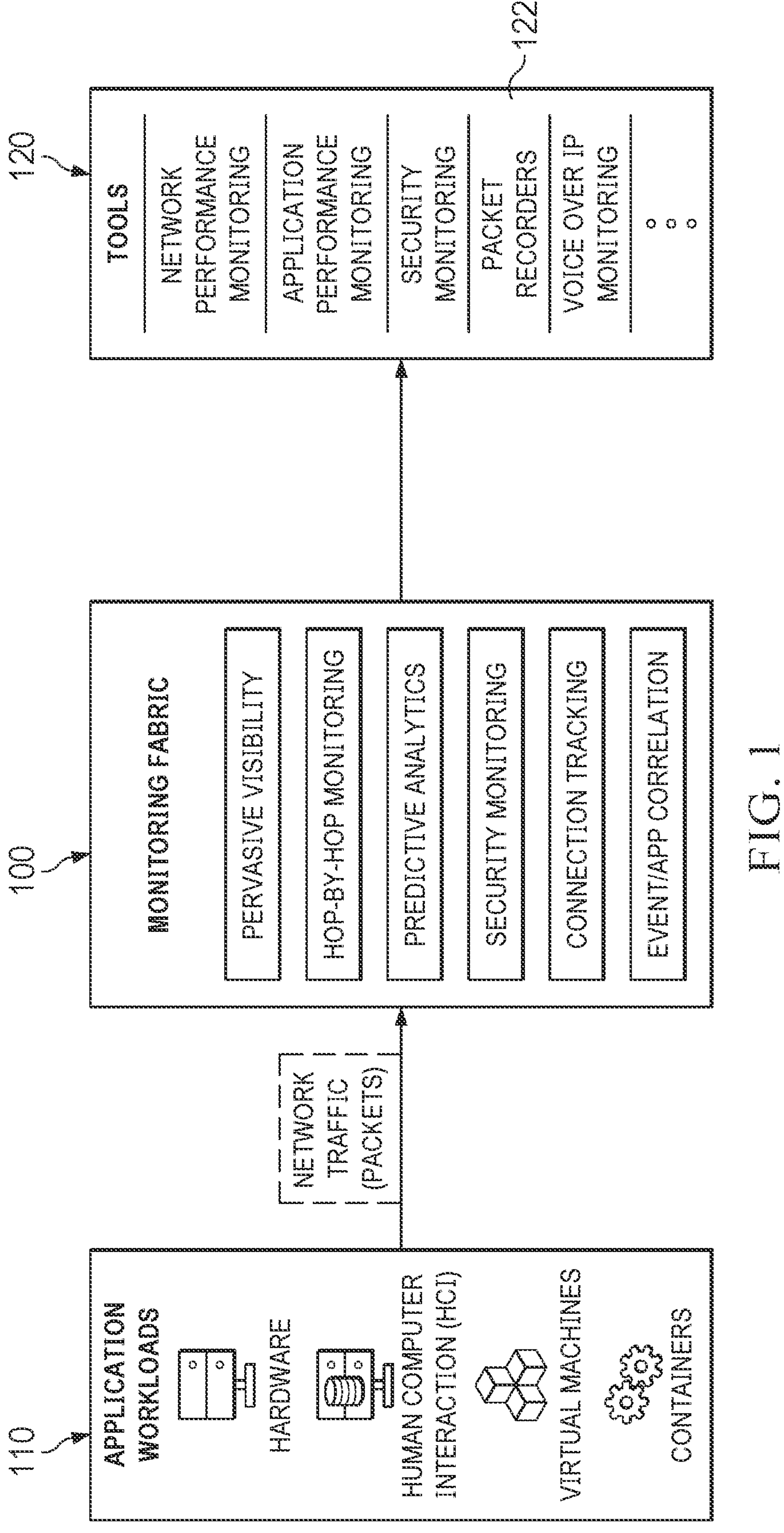
FIG. 1 depicts an example of a monitoring fabric that receives tapped network traffic from a production network.
Figure 2:
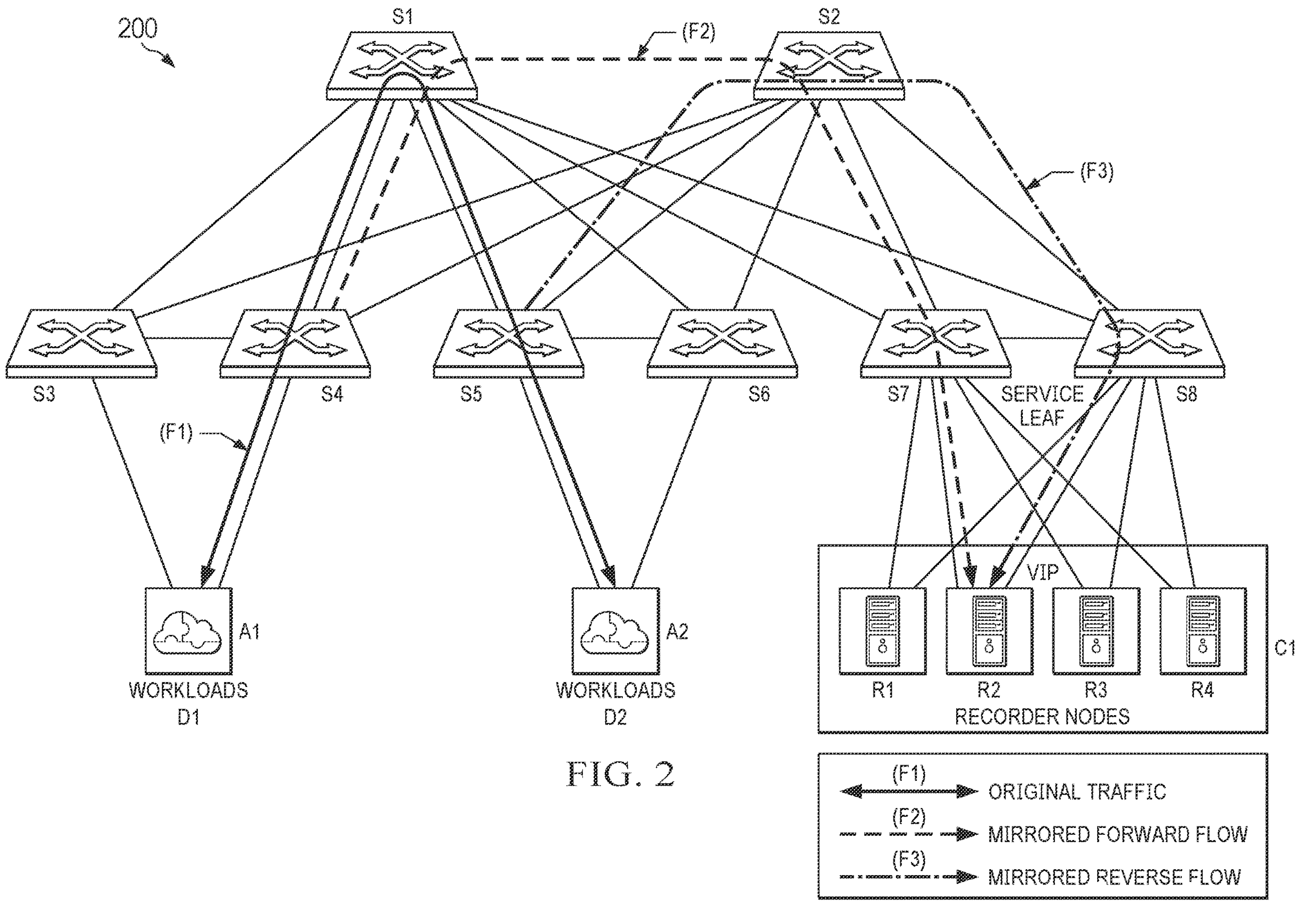
FIG. 2 depicts an example of an enhanced production network with added recorder nodes and service leaf or Top-of-Rack switches according to some embodiments disclosed herein.

FIG. 2 depicts an example of an enhanced production network 200 with added recorder nodes (R1, R2, R3, R4) and Service Leaf or Service Top-of-Rack (TOR) switches (S7, S8). In some embodiments, as illustrated in FIG. 2, the network traffic (e.g., a packet) is captured and mirrored at the ingress (e.g., at a switch, S4, referred to as an ingress switch in this example) and encapsulated in a Generic Routing Encapsulation (GRE) header of the packet. As discussed above, such packet capture can be user-configured or event triggered per a network configuration rule stored in a rules database maintained by the platform. In some cases, the packets can also be captured at a service leaf and forwarded to an attached recorder node. In some cases, packets can be captured at a service leaf and forwarded to an attached Recorder Node.

GRE is a tunneling protocol for encapsulating (i.e., wrapping) packets that use one routing protocol inside the packets of another protocol. GRE works with a variety of network layer protocols and provides a way to set up a direct point-to-point connection across a network, as known to those skilled in the art. GRE is described here as a non-limiting example. Those skilled in the art will appreciate that other tunneling protocols and/or technologies, such as the Virtual Extensible Local Area Network (VxLAN) technology, can be used if supported by switches in the enhanced production network. For example, a packet can be captured and mirrored at the ingress and encapsulated in a VxLAN header.

The mirrored packet with the GRE header is forwarded to a virtual Internet Protocol (VIP) address shared by the recorder nodes, shown in FIG. 2 as recorder nodes R1, . . . , R4 residing in a recorder node cluster, C1. In turn, one of the recorder nodes in the recorder node cluster (e.g., the recorder node, R2) will decapsulate the packet and store the decapsulated packet in its persistent storage. The determination as to which of the recorder nodes in the recorder node cluster will decapsulate and store the packet is described below.

As illustrated in FIG. 2, all the recorder nodes, R1, . . . , R4, in the recorder node cluster, C1, share the same VIP address. This single VIP address can streamline modifications needed when scaling out is required. For instance, inserting a mirroring rule in a rules database for the enhanced production network no longer needs to consider the number of recorder nodes in the enhanced production network. Rather, once a mirroring rule is added as an entry to the rules database with the VIP address, the mirroring rule is applicable (along with any other applicable mirroring rules) to all the recorder nodes in the recorder node cluster having the VIP address. That is, the destination of the mirrored traffic will be one (i.e., the VIP address) which, in turn, will reduce the number of hardware entries (e.g., TCAM) necessary. There can be many entries in the rules database, depending upon what should be filtered out by these rules. Further, while the recorder nodes are added to the production network, they are provisioned to, and centrally managed through, the platform, as discussed above.

When a device (e.g., D1) connects to a switch (e.g., the ingress switch, S4), the switch notes the media access control (MAC) address of the device and adds necessary metadata (e.g., which ingress port) to the encapsulation header in the mirrored packet. The origin metadata about the packet to be captured by the switch can include a source IP (SIP), which indicates the origin switch, and an origin switch port (S4). As a non-limiting example, the switch may use (if selected by a mirror ACL) the MAC address to identify which attached device outgoing packets are being sent from and where to deliver incoming packets. The MAC address identifies the physical device, as opposed to the IP address at the network layer, L3. This is because an IP address is assigned dynamically to a device and can change over time. In practice, any of the L2/L3 headers of a device can be used to install properly-scoped mirroring rules. From there, IP forwarding can be used to forward the L2GRE-encapped (which encapsulates the entire L2 frame) packet to the recorder node. L2GRE encapsulation will contain the Outer L2 Header, the Outer IP Header, the GRE header and the complete original packet. The metadata in the header of the packet can be used by a node (e.g., another switch) downstream from the ingress switch to determine what to do with it. For example, for identification purposes, the metadata can be used to determine the originator (e.g., using the inner source IP address and the metadata field which encodes the SMC) and the ingress interface (which is encoded in the metadata field).

Further, the metadata can be used by the recorder node, R2, when storing packets. With the metadata, the recorder node, R2, can provide richer query semantics (e.g., query and filter down traffic from a specific span location in a logical network segment). This can be utilized by any event correlation engine down the line.

As discussed above, scaling out the recording capabilities of a production network can become necessary as the volume of the network traffic or the storage requirement grows. A single packet recorder will not be sufficient to accommodate such growths. However, if the packets from the same flow (e.g., the original traffic flow, F1) are not stored in the same packet recorder, an aggregation logic will be needed to capture the packets from the flow from more than one recorder nodes (which, in the worst case scenario, can involve all of the recorder nodes) and stitch them together in the order of the original timestamps. This adds complexity and latency to the packet query. For better correlation and performance, in some embodiments, a service leaf (e.g., the service leaf S7 or S8 shown in FIG. 2) is configured to symmetrically hash an incoming tapped or mirrored packet to one of the recorder nodes in the recorder node cluster based on the inner header (which includes, for example, source and destination IP addresses, L4 ports) of the packet. That is, all the recorder nodes in the recorder node cluster will share the same VIP address that is used by all the ingress switches (e.g., switches S3, S4, S5, S6 shown in FIG. 2) in the enhanced production network 200 as the destination IP in an encapsulation header.

To guarantee that both directions (e.g., forward and reverse) of a traffic flow (e.g., a first flow F1) between workloads (which are respectively associated with applications A1 and A2 on devices D1 and D2, as shown in FIG. 2) are mirrored and stored in the same recorder node (so as to eliminating the need for an aggregation logic) in the recorder node cluster, all the recorder nodes that shared the same VIP address are attached to a network interface (e.g., of a service leaf). The network interface is configured to perform symmetric hashing.

As the packet travels from one network location to another (e.g., from a workload application, A1, running on a device, D1, to another workload application, A2, running on another device, D2), the packet is routed through the traffic flow to an ingress node (e.g., the ingress switch, S4). The ingress switch mirrors the packet and sends the copy of the packet to the VIP address of the recorder node cluster, C1, using GRE encapsulation. What needs to be mirrored is configurable (e.g., via a match rule or through a web portal or user interface of the underlying platform). The VIP address is reachable only over the service leaf pairs. Therefore, the mirrored packet is sent to the service leaf pair (can ingress any of them) using traditional routing and bridging techniques. Service leaves symmetrically hash the mirrored packet to one of the recorder nodes.

As illustrated in FIG. 2, the flow through which the copy of the packet is routed from the ingress switch, S4, to the recorder node cluster, C1, is referred to as a mirrored forward flow (e.g., a second flow, F2). The ingress switch forwards the packet to the next switch (e.g., a root node, S1) and the next switch, in turn, forwards the packet to an egress switch (e.g., a switch, S5) that is connected to the designation (e.g., another device, D2). The egress switch then forwards the packet to the designation (i.e., the device, D2).

As discussed above, both directions (e.g., forward and reverse) of the traffic flow, F1, between the two workload applications, A1 and A2, are mirrored and stored in the same recorder node, R2. Specifically, network traffic flowing from the workload application, A1, to the workload application, A2, via the traffic flow, F1, is captured by the ingress switch, S4, and a copy of the packet is sent to the recorder node cluster, C1, via a mirrored forward flow, F2. In reverse, network traffic flowing from the workload application, A2, to the workload application, A1, via the traffic flow, F1, is captured by the ingress switch, S5, and a copy of the packet is sent by the ingress switch, S5, to the recorder node cluster, C1, via a mirrored reverse flow, F3.

In the example of FIG. 2, the mirrored forward flow, F2, is routed from the ingress switch, S4, to the recorder node cluster, C1, through a switch, S1 or S2, and a service node, S7 or S8, which is connected to the recorder node cluster, C1. The mirrored reverse flow, F3, can be routed from the ingress switch, S5, to the recorder node cluster, C1, in a similar way, for instance, through a switch, S1 or S2, and a service node, S7 or S8, which is connected to the recorder node cluster, C1.

In some embodiments, as discussed above, the service node is configured for symmetric hashing in which an incoming tapped or mirrored packet is symmetrically hashed (or sliced) to one of the recorder nodes, R1, . . . , R4, in the recorder node cluster, C1. In some embodiments, each recorder node in the recorder node cluster, C1, has a network interface card configured for symmetric hashing, better known as Receive Side Scaling (RSS) on a host, like a recorder node. With symmetric hashing, each recorder node in the recorder node cluster, C1, is equipped with an in-memory software cache. As those skilled in the art can appreciate, symmetric hashing is a technique that leverages skew to provide load balancing while increasing performance. In this case, copies of packets from the mirrored forward flow, F2, and the mirrored reverse flow, F3, arrive at the same recorder node, R2, per symmetric hashing. Symmetric hashing and load balancing are commonly supported by production networks and thus are not further described herein.

In some embodiments, as discussed above, network configuration rules can be stored in a rules database managed by the platform. In some embodiments, the network configuration rules can include mirroring configuration, which defines which node makes a copy of a packet and sends the copy of the packet through a forward or reverse flow. As the recorder nodes and the service leaves are provisioned to the platform, configuration of these nodes can be centrally performed and managed through the platform. In some embodiments, the platform provides a configuration interface or adding a cluster of recorder nodes, each having a multicore processor (i.e., a microprocessor on a single integrated circuit with two or more separate processing units) that allows distribution of incoming packets. Leveraging multicore processors also enables the scalability of network traffic recording capabilities.

The enhanced (i.e., scaled out) network traffic recording capabilities described above can have many practical applications. As a non-limiting example, unified network observability (UNO) can use an in-network recorder node described above to start collecting relevant traffic when the UNO detects that the performance of an application is starting to degrade below a given threshold. As another non-limiting example, a network detection and response (NDR) system can use the additional ability to trigger packet recording when the NDR system detects anomalies. The packets thus recorded can then be used for forensic analysis.

Figure 3:
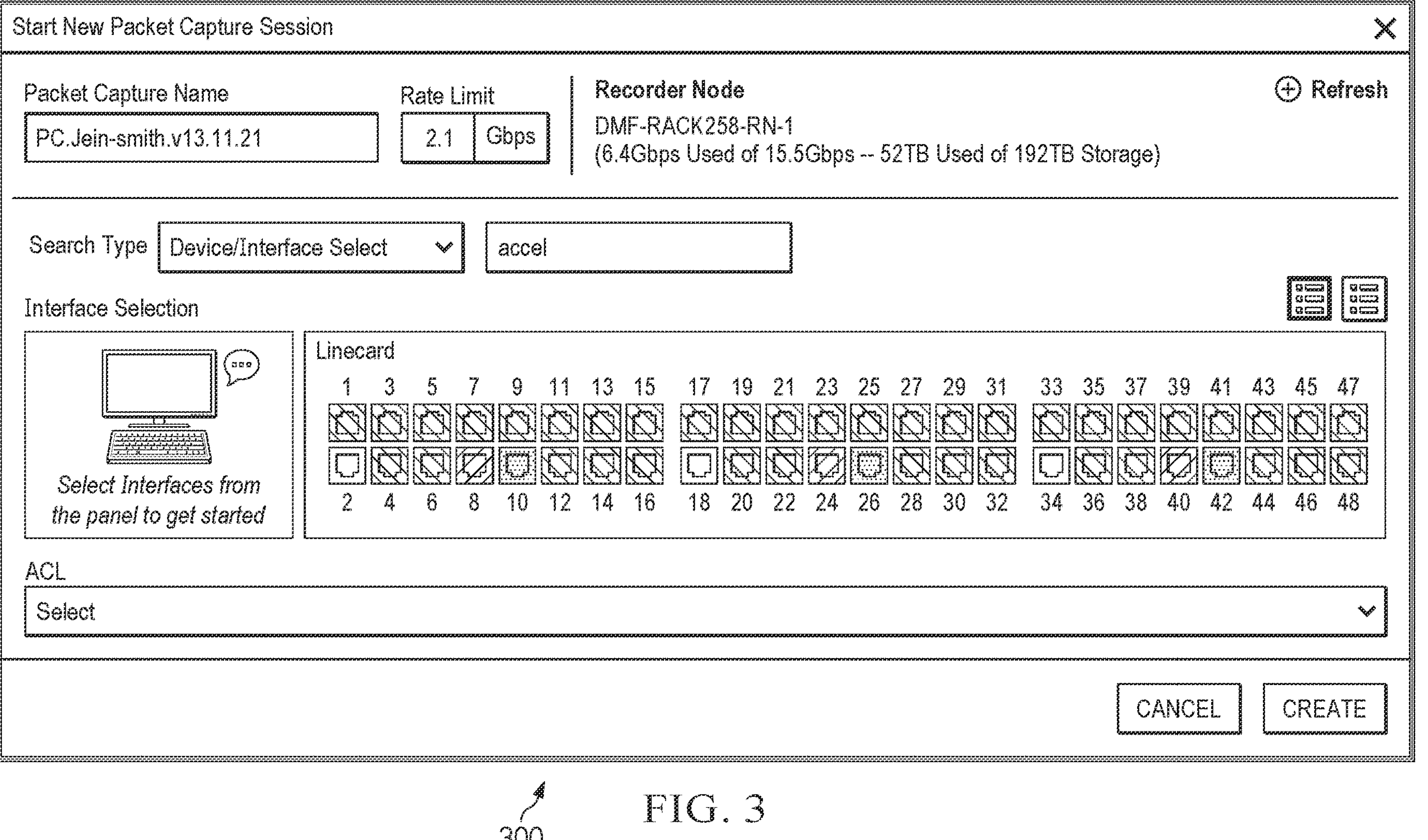
FIG. 3 depicts an example of a web-based graphical user interface for centrally managing enhanced network traffic recording capabilities according to some embodiments disclosed herein.

In some embodiments, the enhanced network traffic recording capabilities described above can be centrally managed through a web-based graphical user interface (GUI) provided by the platform. An example of the web-based GUI 300 is shown in FIG. 3. In some embodiments, the web-based GUI can be configured with several types of functions, for instance, device search, interface search, application search, tag query, virtual machine name search, IP address search, host name search, etc.

For instance, as illustrated in the example of FIG. 3, a user can search and select a device, then search and select interfaces on the selected device. The web-based GUI may provide a default list of devices, showing all the devices that can be recorded.

In some embodiments, interfaces can be searched using tags, either by automatically using some tagged properties or tags manually configured (e.g., by users of the platform). This is essentially a way to categorize a bunch of interfaces that carry a certain role in the production network. This is illustrated in FIG. 4, which shows a web-based GUI 400. In the example of FIG. 4, interfaces with “Finance” tags are used for the mirroring.

Figure 5:
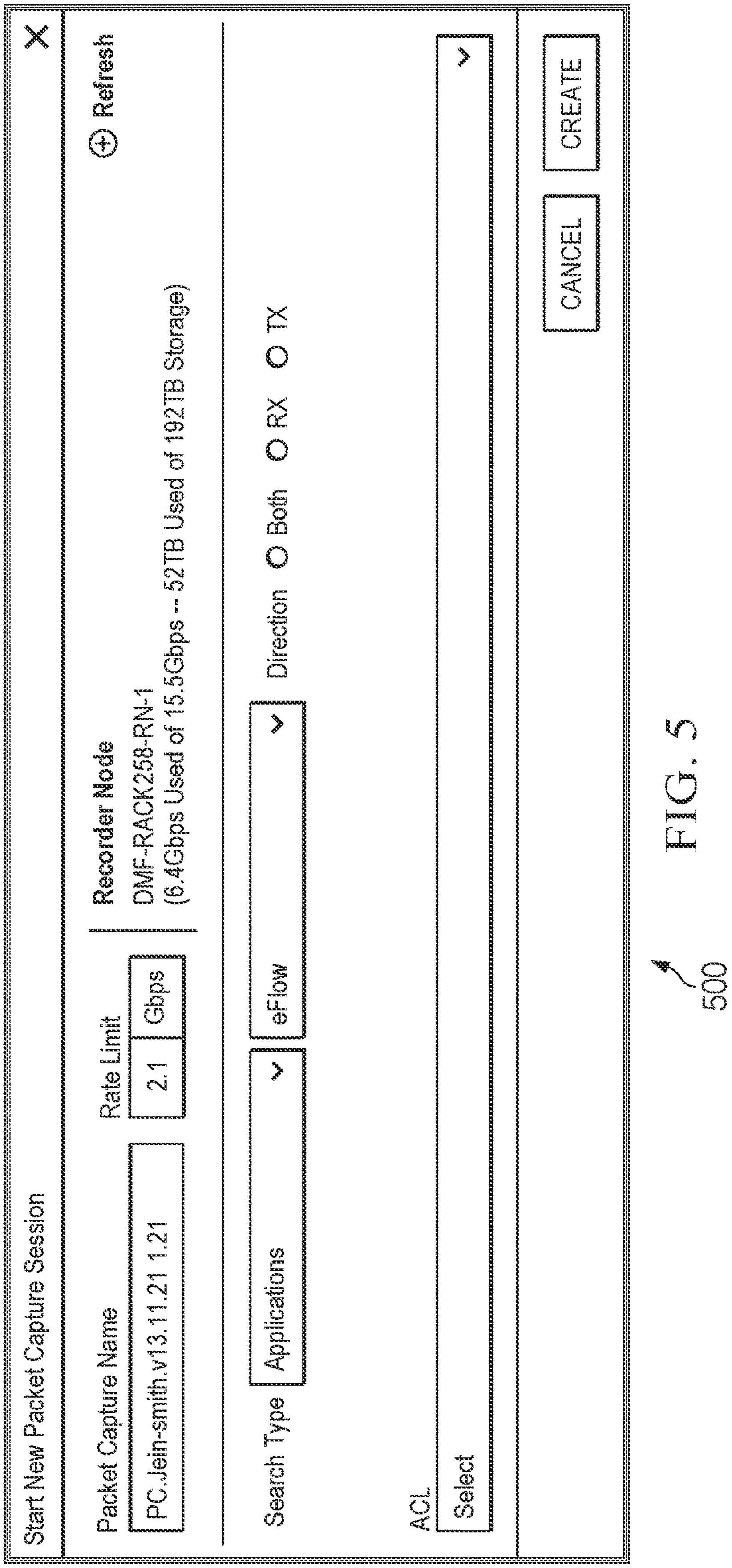
FIG. 5 depicts an example of a web-based graphical user interface for configuring a mirroring session, including which direction(s) of a flow is/are to be recorded, according to some embodiments disclosed herein.

In some embodiments, one or more applications, which can be of different classes, can be searched and selected. An orchestrator running on the platform will then correlate where the network traffic for such applications are seen and start mirroring sessions against the interfaces. As illustrated in FIG. 5, which shows a web-based GUI 500, the mirroring sessions can record flows of both forward and reverse directions.

Figure 6:
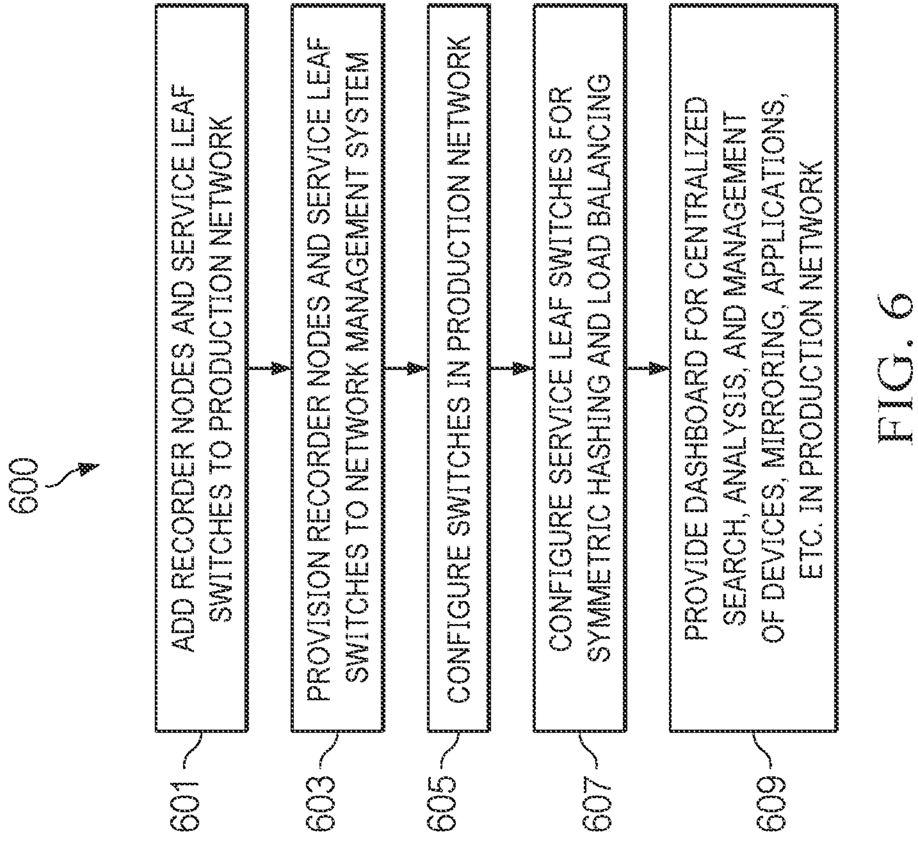
FIG. 6 is a flowchart that illustrates an example of a method for scaling out recording capabilities for a production network according to some embodiments disclosed herein.

Accordingly, referring to FIG. 6, in some embodiments, a method 600 for scaling out recording capabilities for a production network can include adding recorder nodes and service leaf or TOR switches to the production network (601); provisioning the recorder nodes and service leaf or TOR switches to a network management system (e.g., a workload orchestration and workflow automation platform operating in a cloud computing environment) (603); configuring switches in the production network to capture packets of a traffic flow between workload applications, mirror the captured packets (e.g., in both forward and reverse directions of the traffic flow), add metadata to the encapsulation header (which already includes the VIP address of a recorder node cluster as a destination), and route the mirrored packets to the destination (i.e., the VIP address of the recorder node cluster) through the forward and reverse flows, which are independent and separate from the original traffic flow (605); configuring the service leaf or TOR switches to symmetrically hash or slice the mirrored packets and store the mirrored packets to the same recorder node in the cluster of recorder nodes (e.g., for load balancing) to thereby avoid the need to add an aggregation logic (607); and providing a centralized dashboard through which a user can search, select, view, diagnose, analyze, or otherwise manage the devices, interfaces, mirroring, applications, etc. in the production network (609) without needing to deploy a monitoring fabric in a monitoring network.

In this disclosure, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for scaling out recording capabilities for a production network, the method comprising:
- adding recorder nodes and service leaf or Top-of-Rack (TOR) switches to a production network;
- provisioning the recorder nodes and service leaf or TOR switches to a network-wide workload orchestration and workflow automation platform operating in a computing environment;
- configuring switches in the production network to, at ingress:
  - capture packets of a traffic flow between workload applications;
  - mirror the captured packets in both forward and reverse directions of the traffic flow;
  - add metadata to an encapsulation header of each of the captured packets, wherein the encapsulated packet uses a virtual Internet Protocol address associated with a recorder node cluster as its destination IP address, and wherein the recorder node cluster comprises the recorder nodes; and
  - route the mirrored packets to the virtual Internet Protocol address;
- configuring the service leaf or TOR switches to:
  - symmetrically hash the mirrored packets; and
  - store the mirrored packets to a recorder node in the recorder node cluster; and
- providing a centralized dashboard through which a user is able to search, select, view, diagnose, analyze, or manage network components of the production network.

2. The method according to claim 1, wherein the network components comprise devices, interfaces, and applications.

3. The method according to claim 1, wherein the mirrored packets are routed to the virtual Internet Protocol address through a mirrored forward flow and a mirrored reverse flow, wherein the mirrored forward flow routes copies of the packets of the traffic flow captured in a forward direction of the traffic flow, wherein the mirrored reverse flow routes copies of the packets of the traffic flow captured in a reverse direction of the traffic flow, and wherein the copies of the packets captured in the forward direction and the reverse direction are stored in same recorder node in the recorder node cluster.

4. The method according to claim 1, wherein capturing the packets of the traffic flow is performed based on a user configuration or triggered by an event occurring in the production network.

5. The method according to claim 1, wherein the recorder node comprises a persistent storage and wherein the recorder node utilizes the metadata to store the mirrored packets in the persistent storage.

6. The method according to claim 1, wherein each recorder node in the recorder node cluster comprises a multicore processor.

7. The method according to claim 1, wherein the encapsulation header comprises a Generic Routing Encapsulation (GRE) header or a VxLAN header.

8. A system for scaling out recording capabilities for a production network, the system comprising:
- a processor;
- a non-transitory computer-readable medium; and
- instructions stored on the non-transitory computer-readable medium and translatable by the processor for:
  - adding recorder nodes and service leaf or Top-of-Rack (TOR) switches to a production network;
  - provisioning the recorder nodes and service leaf or TOR switches to a network-wide workload orchestration and workflow automation platform operating in a computing environment;
  - configuring switches in the production network to, at ingress:
    - capture packets of a traffic flow between workload applications;
    - mirror the captured packets in both forward and reverse directions of the traffic flow;
    - add metadata to an encapsulation header of each of the captured packets, wherein the encapsulated packet uses a virtual Internet Protocol address associated with a recorder node cluster as its destination IP address, and wherein the recorder node cluster comprises the recorder nodes; and route the mirrored packets to the virtual Internet Protocol address;

configuring the service leaf or TOR switches nodes to:

symmetrically hash the mirrored packets; and store the mirrored packets to a recorder node in the recorder node cluster; and providing a centralized dashboard through which a user is able to search, select, view, diagnose, analyze, or manage network components of the production network.

9. The system of claim 8, wherein the network components comprise devices, interfaces, and applications.

10. The system of claim 8, wherein the mirrored packets are routed to the virtual Internet Protocol address through a mirrored forward flow and a mirrored reverse flow, wherein the mirrored forward flow routes copies of the packets of the traffic flow captured in a forward direction of the traffic flow, wherein the mirrored reverse flow routes copies of the packets of the traffic flow captured in a reverse direction of the traffic flow, and wherein the copies of the packets captured in the forward direction and the reverse direction are stored in same recorder node in the recorder node cluster.

11. The system of claim 8, wherein capturing the packets of the traffic flow is performed based on a user configuration or triggered by an event occurring in the production network.

12. The system of claim 8, wherein the recorder node comprises a persistent storage and wherein the recorder node utilizes the metadata to store the mirrored packets in the persistent storage.

13. The system of claim 8, wherein each recorder node in the recorder node cluster comprises a multicore processor.

14. The system of claim 8, wherein the encapsulation header comprises a Generic Routing Encapsulation (GRE) header or a VxLAN header.

15. A computer program product for scaling out recording capabilities for a production network, the computer program product comprising a non-transitory computer-readable medium storing instructions translatable by a processor for:

adding recorder nodes and service leaf or Top-of-Rack (TOR) switches to a production network;

provisioning the recorder nodes and service leaf or TOR switches to a network-wide workload orchestration and workflow automation platform operating in a computing environment;

configuring switches in the production network to, at ingress:

capture packets of a traffic flow between workload applications;

mirror the captured packets in both forward and reverse directions of the traffic flow;

add metadata to an encapsulation header of each of the captured packets, wherein the encapsulated packet uses a virtual Internet Protocol address associated with a recorder node cluster as its destination IP Address, and wherein the recorder node cluster comprises the recorder nodes; and route the mirrored packets to the virtual Internet Protocol address;

configuring the service leaf or TOR switches nodes to:

symmetrically hash the mirrored packets; and store the mirrored packets to a recorder node in the recorder node cluster; and providing a centralized dashboard through which a user is able to search, select, view, diagnose, analyze, or manage network components of the production network.

16. The computer program product of claim 15, wherein the network components comprise devices, interfaces, and applications.

17. The computer program product of claim 15, wherein the mirrored packets are routed to the virtual Internet Protocol address through a mirrored forward flow and a mirrored reverse flow, wherein the mirrored forward flow routes copies of the packets of the traffic flow captured in a forward direction of the traffic flow, wherein the mirrored reverse flow routes copies of the packets of the traffic flow captured in a reverse direction of the traffic flow, and wherein the copies of the packets captured in the forward direction and the reverse direction are stored in same recorder node in the recorder node cluster.

18. The computer program product of claim 15, wherein capturing the packets of the traffic flow is performed based on a user configuration or triggered by an event occurring in the production network.

19. The computer program product of claim 15, wherein the recorder node comprises a persistent storage and wherein the recorder node utilizes the metadata to store the mirrored packets in the persistent storage.

20. The computer program product of claim 15, wherein the encapsulation header comprises a Generic Routing Encapsulation (GRE) header or a VxLAN header.

* * * * *